(12) United States Patent
Zajac et al.

(10) Patent No.: US 10,017,253 B1
(45) Date of Patent: Jul. 10, 2018

(54) AIRCRAFT CABIN PRESSURE ASSESSMENT SYSTEMS AND METHODS

(71) Applicant: THE BOEING COMPANY, Chicago, IL (US)

(72) Inventors: Michal Zajac, Gdansk (PL); Anne Jacqueline Gertruda Theodora Scholtes, Delft (NL); Maxim Constantijn Vos, Madrid (ES)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/435,384

(22) Filed: Feb. 17, 2017

(51) Int. Cl.
   *B64D 11/00* (2006.01)
   *G08B 21/18* (2006.01)
   *G06F 3/0488* (2013.01)

(52) U.S. Cl.
   CPC .......... *B64D 11/0015* (2013.01); *G08B 21/18* (2013.01); *G06F 3/04886* (2013.01)

(58) Field of Classification Search
   CPC ............................ B64D 11/0015; G08B 21/18
   USPC ....................................................... 340/573.1
   See application file for complete search history.

(56) References Cited

U.S. PATENT DOCUMENTS

| | | | | |
|---|---|---|---|---|
| 2008/0059281 A1* | 3/2008 | Tower | ..................... | G06Q 30/02 715/230 |
| 2010/0145765 A1* | 6/2010 | Kantarek | ............... | G06Q 30/02 705/7.32 |
| 2010/0308992 A1* | 12/2010 | Al-Rehaili | ............ | B63C 9/0005 340/539.13 |
| 2014/0162542 A1* | 6/2014 | Huart | ..................... | B64D 13/02 454/74 |
| 2015/0019049 A1* | 1/2015 | Kavounas | ............... | B64D 45/00 701/14 |
| 2015/0373121 A1* | 12/2015 | Secilmis | ................. | H04L 67/12 455/41.2 |

OTHER PUBLICATIONS

Eckberg, D. L. (1977). Baroreflex Inhibition of the Human Sinus Node: Importance of Stimulus Intensity, Duration, and Rate of Pressure Change. J.Physiol, 561-577. http://www.ncbi.nlm.nih.gov/pmc/articles/PMC1283726/pdf/iphysiol00806-0043.pdf.

Pau, H. W. (1999). Inner Ear Damage in Torp-Operated Ears: Experimental Study on Danger from Environmental Air Pressure Changes [Abstract]. Annals of Otology, Rhinology & Laryngology, 108(8), 745-749. http://aor.sagepub.com/content/108/8/745.short.

Patron, R. S., Botez, R. M., & Labour, D. (2012). Vertical profile optimization for the Flight Management System CMA-9000 using the golden section search method. IECON 2012—38th Annual Conference on IEEE Industrial Electronics Society. https://www.researchgate.net/profile/Ruxandra_Botez/publication/261151505_Vertical_profile_optimization_for_the_Flight_Management_System_CMA-9000_using_the_golden_section_search_method/links/53ee3d940cf26b9b7dc658d1.pdf.

(Continued)

*Primary Examiner* — Omar Casillashernandez
(74) *Attorney, Agent, or Firm* — Joseph M. Butscher; The Small Patent Law Group, LLC (57) ABSTRACT

A cabin pressure assessment system for an aircraft includes a plurality of polling devices within an internal cabin of the aircraft. The plurality of polling devices are associated with passenger seats onboard the aircraft. A cabin pressure assessment control unit is communicatively coupled to the plurality of polling devices. The cabin pressure assessment control unit is configured to receive cabin pressure comfort data from the plurality of polling devices.

50 Claims, 5 Drawing Sheets

(56) References Cited

OTHER PUBLICATIONS

Richards, L. G., & Jacobson, I. D. (1974). Questionnaire Studies of Airline Passenger Comfort (Rep.). http://ntrs.nasa.gov/archive/nasa/casi.ntrs.nasa.gov/19740021347.pdf.

Gubisch, M. (Mar. 19, 2012). Manufacturers aim for more comfortable cabin climate. Retrieved Aug. 24, 2016, from https://www.flightglobal.com/news/articles/in-focus-manufacturers-aim-for-more-comfortable-cabin-climate-369425/.

Beard, R. (Jan. 20, 2014). Why Customer Satisfaction is Important (6 Reasons). Retrieved Aug. 25, 2016, from http://blog.clientheartbeat.com/why-customer-satisfaction-is-important/.

* cited by examiner

AIRCRAFT CABIN PRESSURE ASSESSMENT SYSTEMS AND METHODS

FIELD OF THE DISCLOSURE

Embodiments of the present disclosure generally relate to systems and methods for assessing aircraft cabin pressure, and, more particularly, to systems and methods for adjusting a rate of aircraft ascent and/or descent based on assessments of the aircraft cabin pressure.

BACKGROUND OF THE DISCLOSURE

Commercial aircraft are used to transport passengers between various locations. As an aircraft climbs and descends, air pressure within an internal cabin of the aircraft changes. For example, during ascent, air pressure within the internal cabin decreases. Conversely, during descent, air pressure within the internal cabin increases.

Human inner ears and sinuses are sensitive to pressure changes during ascent and descent of an aircraft. If a rate of change of air pressure within the internal cabin changes too quickly, passengers may experience discomfort. The rate of change of air pressure within the internal cabin is directly proportional to the rate of ascent or descent. For example, as the rate of descent increases, so too does the rate of change of air pressure within the internal cabin. As such, while a faster rate of ascent and/or descent reduces a flight time of an aircraft, an increased rate of ascent and/or descent may cause discomfort within inner ears and sinuses of the passengers. For example, a steep, quick rate of descent may cause inner ears of the passengers to experience a popping sensation. Therefore, aircraft operators are careful to control rates of ascent and descent in order to ensure that the pressure differential within the internal cabin does not cause passenger discomfort.

However, decreasing a rate of ascent and/or descent of an aircraft increases a flight time of an aircraft. Yet most, if not all, aircraft passengers typically prefer the shortest and safest possible time between takeoff and landing. Moreover, the longer an aircraft is flying, the more fuel the aircraft consumes.

SUMMARY OF THE DISCLOSURE

A need exists for a system and method for assessing internal cabin pressure within an aircraft. A need exists for a system and method for determining efficient rates of ascent and descent of an aircraft that ensure passenger comfort during such times of ascent and descent.

With those needs in mind, certain embodiments of the present disclosure provide a cabin pressure assessment system for an aircraft. The cabin pressure assessment system includes a plurality of polling devices within an internal cabin of the aircraft. The plurality of polling devices are associated with passenger seats onboard the aircraft. A cabin pressure assessment control unit is communicatively coupled to the plurality of polling devices. The cabin pressure assessment control unit is configured to receive cabin pressure comfort data from the plurality of polling devices. The cabin pressure comfort data may relate to one or both of an ascent or a descent of the aircraft during a flight.

In at least one embodiment, the cabin pressure assessment control unit is configured to output a cabin pressure polling signal to the plurality of polling devices. The plurality of polling devices are configured to display a cabin pressure poll for passengers based on the cabin pressure polling signal. The cabin pressure poll may include indicia of negative comfort, neutral comfort, and positive comfort. The indicia may include one or more of a numerical representation, a text representation, a graphic representation, or a color-coded representation.

In at least one embodiment, the cabin pressure assessment control unit is configured to output a flight recommendation signal regarding one or more portions of a future flight based on the cabin pressure comfort data. For example, the flight recommendation signal may represent a suggestion to decrease one or both of an ascent rate or a descent rate in response to the cabin pressure comfort data being negative. As another example, the flight recommendation signal may represent a suggestion to increase one or both of an ascent rate or a descent rate in response to the cabin pressure comfort data being positive.

The cabin pressure assessment control unit may determine a weighted average of the cabin pressure comfort data based on:

$$\beta = \frac{n_{pos} + 0.5 \cdot n_{neut} + 0 \cdot n_{neg}}{n_{pos} + n_{neut} + n_{neg}}$$

in which $\beta$ is a pressure comfort factor for a particular time period of a flight, $n_{pos}$ is a number of passengers with positive feedback, $n_{neut}$ is a number of passengers with neutral feedback, and $n_{neg}$ is a number of passengers with negative feedback. The cabin pressure assessment control unit may determine pressure comfort factors $\beta_c$ for an ascent of a flight and $\beta_d$ for a descent of a flight, and corrected pressure differentials for the ascent and descent based on:

$$\partial p_{corrected} = \beta \cdot \partial p_{max}$$

in which $\partial p_{max}$ is a maximum pressure differential measured during the flight.

The cabin pressure assessment system may also include a poll triggering device. The poll triggering device is configured to be engaged to cause the cabin pressure assessment control unit to output a cabin pressure polling signal to the plurality of polling devices.

In at least one embodiment, at least one of the plurality of polling devices includes a screen mounted to a passenger seat. In at least one embodiment, at least one of the plurality of polling devices is a handheld device of a passenger.

The cabin pressure assessment control unit may be configured to output a polling awareness signal to the plurality of polling devices. The plurality of polling devices are configured to display a polling awareness message based on the polling awareness signal. The polling awareness message provides guidance as to a cabin pressure poll.

Certain embodiments of the present disclosure provide a cabin pressure assessment method for an aircraft. The cabin pressure assessment method includes associating a plurality of polling devices with passenger seats within an internal cabin of the aircraft, communicatively coupling a cabin pressure assessment control unit to the plurality of polling devices, and receiving cabin pressure comfort data by the cabin pressure assessment control unit from the plurality of polling devices. The method may also include using the cabin pressure assessment control unit to output a cabin pressure polling signal to the plurality of polling devices, and displaying a cabin pressure poll for passengers based on the cabin pressure polling signal on the plurality of polling devices.

Certain embodiments of the present disclosure provide an aircraft that includes a fuselage defining an internal cabin, a plurality of passenger seats within the internal cabin, and a cabin pressure assessment system for an aircraft. The cabin pressure assessment system includes a plurality of polling devices within the internal cabin. The plurality of polling devices are associated with the passenger seats. A cabin pressure assessment control unit is communicatively coupled to the plurality of polling devices.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide cabin pressure assessment systems and methods that are configured to determine efficient aircraft ascents and descents based on passenger comfort feedback. By gathering passenger feedback on pressure comfort during one or more flights, the cabin pressure assessment systems and methods may determine a pressure comfort factor, which may be used to determine or otherwise modify rates of ascent and/or descent for future flights. The ascent and/or descent rates may be determined, at least in part, based on passenger comfort alone, or in addition to flight cost reduction considerations (for example, fuel conservation). The methods may be iterated over multiple flights to provide passenger comfort data of increased accuracy and reliability.

Certain embodiments of the present disclosure provide a cabin pressure assessment system for an aircraft that includes a plurality of polling devices within the internal cabin, and a cabin pressure assessment control unit that is communicatively coupled to the plurality of polling devices. The cabin pressure assessment control unit is configured to receive cabin pressure or comfort data (such as input by passengers) from the plurality of polling devices. The cabin pressure assessment control unit analyzes the cabin pressure comfort data in order to determine whether a rate of ascent or a rate of descent of a future flight should be modified. The cabin pressure comfort data may be input during or after an ascent and/or descent of the aircraft.

Figure 1:
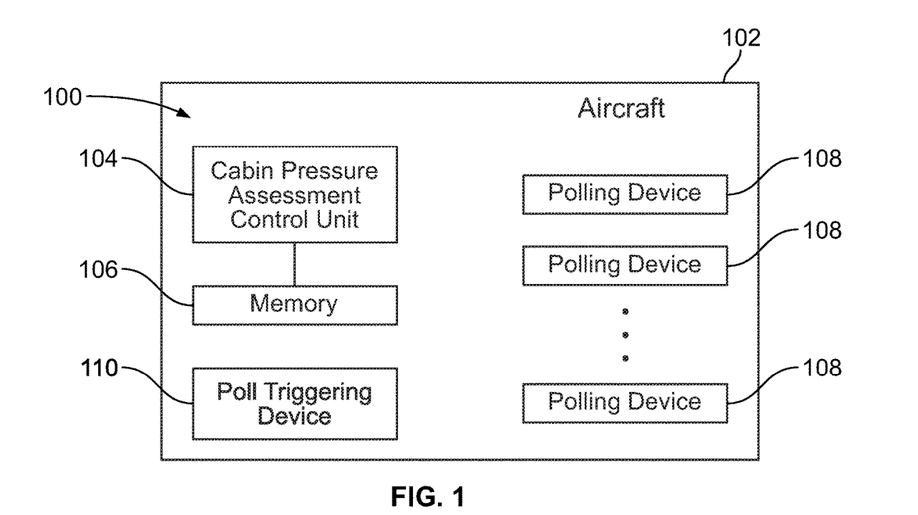
FIG. 1 is a schematic representation of a cabin pressure assessment system onboard an aircraft, according to an embodiment of the present disclosure.

FIG. 1 is a schematic representation of a cabin pressure assessment system 100 onboard an aircraft 102, according to an embodiment of the present disclosure. The cabin pressure assessment system 100 includes a cabin pressure assessment control unit 104 coupled to a memory 106, such as through one or more wired or wireless connections. In at least one embodiment, the cabin pressure assessment control unit 104 may include a memory, instead of being communicatively coupled to a separate and distinct memory. As shown, the cabin pressure assessment control unit 104 and the memory 106 are onboard the aircraft 102. In at least one other embodiment, the cabin pressure assessment control unit 104 and the memory 106 may be remotely located from the aircraft 102 (such as at a land-based monitoring station), and in communication with the aircraft 102 through one more communication devices, such as radio units, transceivers, and/or the like. In at least one other embodiment, the cabin pressure assessment control unit 104 may be onboard the aircraft 102, while the memory 106 is remotely located from the aircraft 102.

The cabin pressure assessment control unit 104 is also in communication (that is, communicatively coupled) with a plurality of passenger polling devices 108 onboard the aircraft 102. In at least one embodiment, the polling devices 108 are mounted on passenger seats, such as in-flight entertainment systems having display screens mounted to rear surfaces of seat headrests. In at least one other embodiment, the polling devices 108 may be passenger mobile devices having display screens. For example, during a flight, the cabin pressure assessment control unit 104 may be in communication with a handheld mobile phone or smart device of a passenger, such as through one or more wired or wireless (for example, WiFi) connections. In at least one embodiment, the polling devices 108 include monitors mounted to portions of the aircraft within an internal cabin (such as in-flight entertainment systems) and/or passenger mobile devices.

The cabin pressure assessment system 100 may also include a poll triggering device 110, which may be communicatively coupled to the cabin pressure assessment control unit 104 and/or the polling devices 108. The poll triggering device 110 may be a computer, workstation, touchscreen, handheld computing device (such as a smart phone), and/or the like onboard the aircraft 102 that is configured to be engaged by personnel onboard the aircraft, such as a pilot, flight attendant, or other such flight crew to output a cabin pressure polling signal to the polling devices 108. For example, aircraft personnel may engage the poll triggering device 110 during ascent and/or descent of the aircraft 102 to output the cabin pressure poll to the polling devices 108 through the cabin pressure assessment control unit 104. In response to receiving the cabin pressure polling signal from the cabin pressure assessment control unit 104, the polling devices 108 display the cabin pressure poll to passengers. In at least one embodiment, the cabin pressure poll may be automatically output to the polling devices 108 during particular portions of the flight, such as when the aircraft climbs (that is, ascends) and descends. For example, a flight computer of the aircraft 102 may automatically trigger the cabin pressure assessment control unit 104 to output the cabin pressure poll during ascent and descent of the aircraft 102. In at least one embodiment, the cabin pressure assessment system 100 may not include the poll triggering device. For example, passengers may be verbally asked questions regarding passenger comfort by aircraft personnel, who may input the passenger responses into the cabin pressure assessment control unit 104.

In operation, the cabin pressure assessment control unit 104 outputs a cabin pressure polling signal to the polling devices 108 during one or more portions of a flight, such as during ascent and descent. The cabin pressure assessment control unit 104 may output the cabin pressure polling signal during the flight, such as during ascent and/or descent, or after the flight, such as after the aircraft 102 has landed and is taxiing to a gate. Upon receipt of the cabin pressure polling signal, the polling devices 108 display a cabin pressure poll based on the cabin pressure polling signal. The cabin pressure poll instructs a passenger associated within a particular polling device 108 to rate cabin pressure comfort during a particular period of the flight, such as during ascent and/or descent.

The cabin pressure poll that is displayed on the polling devices 108 includes indicia related to a cabin pressure comfort. In at least one embodiment, the indicia may include numerical representations of cabin pressure comfort. For example, the cabin pressure poll may indicate negative comfort (for example, passenger discomfort due to pressure differential) with a negative one (−1), neutral comfort with a zero (0), and positive comfort (for example, a pleasant passenger experience devoid of inner ear or sinus discomfort) with a positive one (+1). In at least one other embodiment, the cabin pressure poll may provide a numerical comfort scale, such as a scale of one (1) to ten (10), with one (1) being maximum discomfort and ten being maximum comfort (10), or vice versa.

In at least one other embodiment, the indicia may include a text representation of cabin pressure comfort. For example, the cabin pressure poll may display text such as "discomfort," "neutral," and "comfortable."

In at least one other embodiment, the indicia may include a color based representation of cabin pressure comfort. For example, the cabin pressure poll may associate a red touchscreen area with discomfort, a yellow touchscreen area with neutrality, and a green touchscreen area with comfort.

In at least one other embodiment, the indicia may include a graphics based representation of cabin pressure comfort. For example, the cabin pressure poll may associate a frowning face with discomfort, a plain face with neutrality, and a smiling face with comfort.

As the cabin pressure poll is displayed on the polling devices 108, passengers associated with the polling devices 108 input ratings responses. The passenger responses are output as poll response signals, which are then received by the cabin pressure assessment control unit 104. The cabin pressure assessment control unit 104 analyzes the poll response data received from the poll response signals to assess cabin pressure comfort onboard the aircraft during particular time periods, such as ascent and descent of the aircraft 102. In at least one embodiment, the cabin pressure assessment control unit 104 aggregates all of the poll response signals from the polling devices 108 to determine an aggregate pressure comfort factor.

If, for example, the pressure comfort factor is negative, the cabin pressure assessment control unit 104 outputs a flight recommendation signal to aircraft personnel, such as through a display on a flight computer, for example. The flight recommendation signal may be displayed or broadcast to aircraft personnel as a suggestion to modify the ascent or descent of the current flight and/or a future flight. For example, if the pressure comfort factor is negative for ascent and/or descent, the flight recommendation signal may provide a recommendation to decrease a rate of ascent and/or descent for future flights. If, however, the pressure comfort factor is neutral or positive, the flight recommendation signal may provide a recommendation to maintain a rate of ascent and/or descent for future flights. If, however, the pressure comfort factor is positive, the flight recommendation signal may provide a recommendation to incrementally increase a rate of ascent and/or descent for future flights, in an effort to reduce fuel consumption (and costs) and reduce flight times, while ensuring that the passengers do not experience discomfort due to an excessive cabin pressure differential with respect to periods of ascent and/or descent.

The cabin pressure assessment control unit 104 may output a flight recommendation signal based on a single flight. In at least one other embodiment, the cabin pressure assessment control unit 104 may store poll response signals in memory 106 over a plurality of flights, and output a flight recommendation signal based on the plurality of flights. Moreover, cabin pressure assessment control units 104 of multiple aircraft 102 may be used to determine a unified flight recommendation signal based on a plurality of flights of a plurality of aircraft 102.

In at least one embodiment, at the end of each flight, passenger feedback in the form of poll response data based on the poll response signals is collected by the cabin pressure assessment control unit 104 via the polling devices 108, and may be stored in memory 106. The cabin pressure assessment control unit 104 analyzes the poll response data to determine one or more pressure comfort factors for various portions of a flight. For example, the cabin pressure assessment control unit 104 may determine a pressure comfort factor for an ascent of the flight, and a pressure comfort factor for a descent of the flight. In at least one embodiment, the cabin pressure assessment control unit 104 determines a weighted average of the poll response data based on the following equation:

$$\beta = \frac{n_{pos} + 0.5 \cdot n_{neut} + 0 \cdot n_{neg}}{n_{pos} + n_{neut} + n_{neg}}$$

In which β is the pressure comfort factor for a particular time period of the flight, such as an ascent (climb) or a descent, $n_{pos}$ is the number of passengers with positive feedback, $n_{neut}$ is the number of passengers with neutral feedback, and $n_{neg}$ is the number of passengers with negative feedback. In at least one embodiment, in case of mostly positive feedback, the pressure comfort factor β will be close to 1, while in case of mostly negative feedback, the pressure comfort factor β will be close to 0. Optionally, the weightings in the equation (such as 1, 0.5, and 0) may differ than shown. As such, the cabin pressure assessment control unit may determine two pressure comfort factors $\beta_c$ and $\beta_d$ for the climb (c) and descent (d) phases, respectively.

Next, the cabin pressure assessment control unit 104 may determine corrected pressure differentials (that is, corrected rates of change of cabin pressure over time) ($\partial p_{corrected}$) for the climb and descent phases of a subsequent flight via the following equation:

$$\partial p_{corrected} = \beta \cdot \partial p_{max}$$

In which $\partial p_{max}$ is the maximum pressure differential (that is, the maximum rate of change of cabin pressure over time) that was measured during the flight. $\partial p_{max}$ may be measured by an instrument or device (such as one or more pressure sensors) onboard an aircraft, for example. Optionally, instead of a maximum pressure differential, an average pressure differential during a flight may be used. The cabin pressure assessment control unit 104 may iterate such process over several flights. The corrected pressure differentials may then be correlated with modified rates of ascent and/or descent, which the cabin pressure assessment control unit 104 may output as a future flight suggestion.

In at least one embodiment, passengers onboard the aircraft 102 may prompt one or more of the polling devices 108 to show the cabin pressure poll. For example, the polling devices 108 may include touchscreens, keypads, and/or the like that allow passengers to initiate the cabin pressure poll (such as by causing the cabin pressure assessment control unit 104 to output the cabin pressure polling signal). In this manner, the cabin pressure poll may be shown on one or more of the polling devices 108 based on a passenger-initiated command.

The cabin pressure poll may be shown on the polling devices 108 during the portion of a flight that is the subject of the cabin pressure poll (such as during takeoff or landing), and/or after such portion. During periods of aircraft motion, certain passengers may prefer not to engage the polling devices 108. As such, the passengers may engage the polling devices 108 after such motion.

As shown, a plurality of polling devices 108 may be onboard the aircraft 102. Each passenger onboard the aircraft 102 may be assigned a polling device 108, such as via their seat assignment. In this manner, each polling device 108 may be associated with a respective passenger seat. Optionally, not all of the passenger seats onboard the aircraft 102 may be associated with a polling device 108.

Before a flight (such as when the aircraft 102 is parked at a gate) or during a flight, the cabin pressure assessment control unit 104 may output a polling awareness signal to the polling devices 108, which may display a polling awareness message (such as a graphic, text, video, and/or audio message). The polling awareness message provides guidance (for example instructions on how to interact with the polling devices 108) for passengers to consider during a flight, factors to be aware of during the flight, topics for polling, and the like. For example, the polling awareness message may recite "In an effort to enhance your flight experience, you may be asked to rate your level of comfort during takeoff and landing." The polling awareness message may then display a sample cabin pressure poll on the polling devices 108, and/or instructions for inputting passenger-input motion effects data.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the cabin pressure assessment control unit 104 may be or include one or more processors that are configured to control operation of cabin pressure assessment system 100, as described above.

The cabin pressure assessment control unit 104 is configured to execute a set of instructions that are stored in one or more data storage units or elements (such as one or more memories), in order to process data. For example, the cabin pressure assessment control unit 104 may include or be coupled to one or more memories, such as the memory 106. The data storage units may also store data or other information as desired or needed. The data storage units may be in the form of an information source or a physical memory element within a processing machine.

The set of instructions may include various commands that instruct the cabin pressure assessment control unit 104 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the cabin pressure assessment control unit 104. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the cabin pressure assessment control unit 104 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
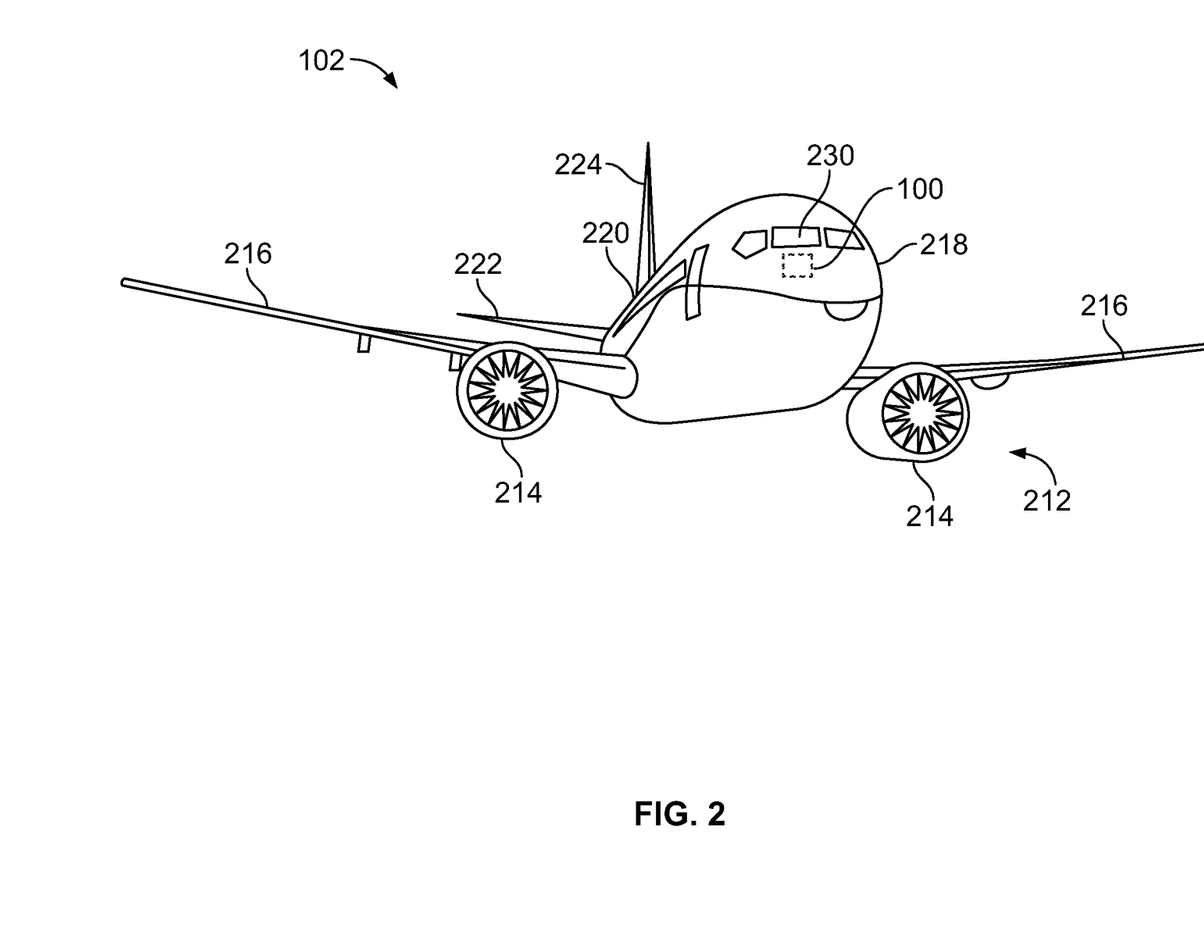
FIG. 2 is a diagrammatic representation of a front perspective view of an aircraft, according to an embodiment of the present disclosure.

FIG. 2 illustrates a front perspective view of the aircraft 102, according to an embodiment of the present disclosure.

The aircraft 102 includes a cabin pressure assessment system 100, as described above with respect to FIG. 1. The aircraft 102 includes a propulsion system 212 that may include two turbofan engines 214, for example. Optionally, the propulsion system 212 may include more engines 214 than shown. The engines 214 are carried by wings 216 of the aircraft 102. In other embodiments, the engines 214 may be carried by a fuselage 218 and/or an empennage 220. The empennage 220 may also support horizontal stabilizers 222 and a vertical stabilizer 224.

The fuselage 218 of the aircraft 102 defines an internal cabin, which may include a cockpit 230, one or more work sections (for example, galleys, personnel carry-on baggage areas, and the like), one or more passenger sections (for example, first class, business class, and coach sections), and an aft section in which an aft rest area assembly may be positioned. Each of the passenger seats within the internal cabin may be associated with a respective polling device 108 (shown in FIG. 1). For example, a polling device 108 may be mounted proximate to each passenger seat, such as in front of each passenger seat (for example, mounted to a rear surface of a head rest of an immediately forward passenger seat), and/or held by a passenger within the passenger seat (for example, a mobile device of the passenger).

Figure 3A:
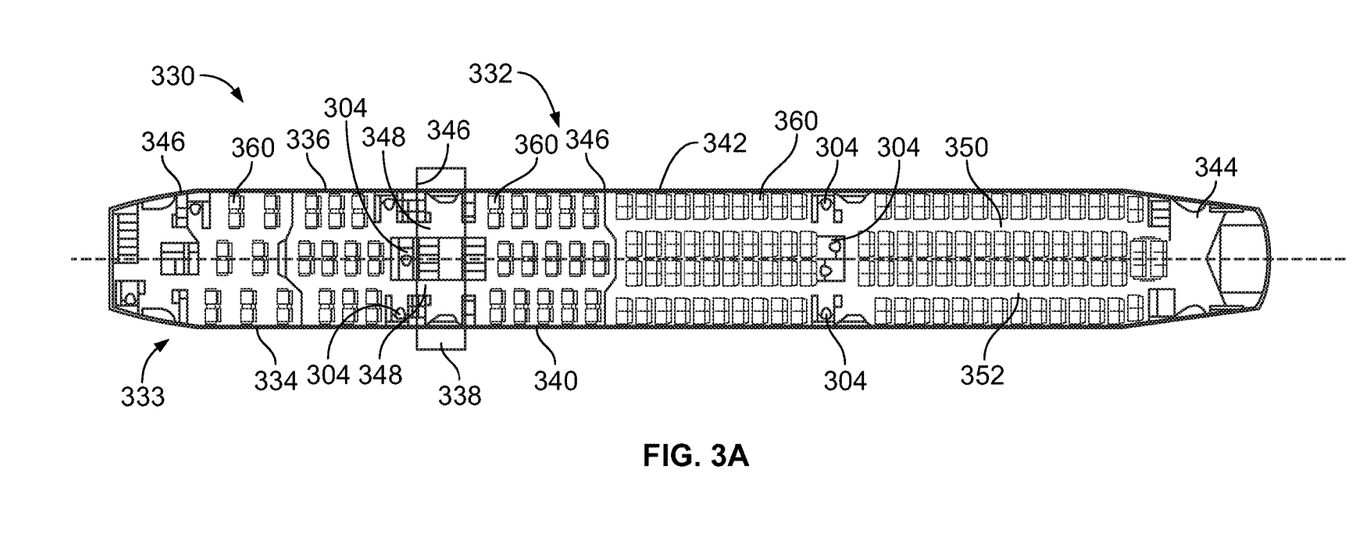
FIG. 3A is a diagrammatic representation of a top plan view of an internal cabin of an aircraft, according to an embodiment of the present disclosure.

FIG. 3A illustrates a top plan view of an internal cabin 330 of an aircraft, according to an embodiment of the present disclosure. The internal cabin 330 may be within a fuselage 332 of the aircraft. For example, one or more fuselage walls may define the internal cabin 330. The internal cabin 330 includes multiple sections, including a front section 333, a first class section 334 (or first class suites, cabins, for example), a business class section 336, a front galley station 338, an expanded economy or coach section 340, a standard economy or coach section 342, and an aft section 344. The internal cabin 330 may also include multiple chambers 304, such as lavatories and galley stations. Passenger seats 360 are secured within the internal cabin 330. Polling devices 108 (shown in FIG. 1) are associated with a plurality of the passenger seats 360. For example, each passenger seat 360 within the internal cabin 330 may be associated with a polling device 108. It is to be understood that the internal cabin 330 may include more or less sections than shown. For example, the internal cabin 330 may not include a first class section, and may include more or less galley stations than shown. Each of the sections may be separated by a cabin transition area 346, which may include class divider assemblies between aisles 348, 350, and/or 352.

As shown in FIG. 3A, the internal cabin 330 includes two aisles 350 and 352 that lead to the aft section 344. Optionally, the internal cabin 330 may have less or more aisles than shown. For example, the internal cabin 330 may include a single aisle that extends through the center of the internal cabin 330 that leads to the aft section 344 (see, for example, FIG. 3B).

Figure 3B:
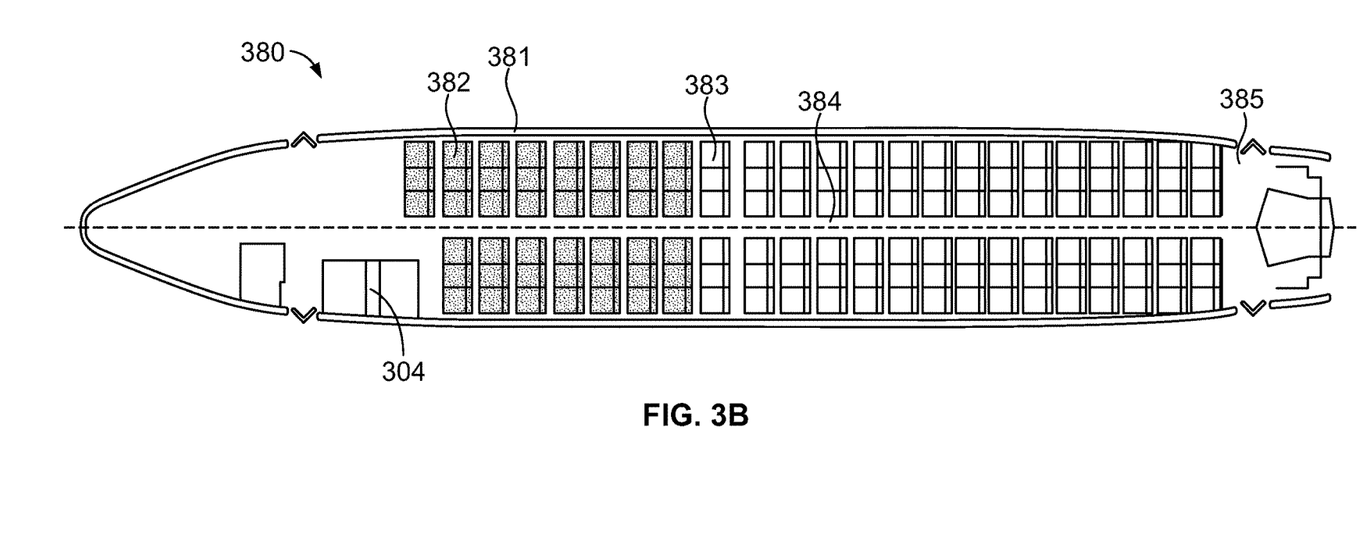
FIG. 3B is a diagrammatic representation of a top plan view of an internal cabin of an aircraft, according to an embodiment of the present disclosure.

FIG. 3B illustrates a top plan view of an internal cabin 380 of an aircraft, according to an embodiment of the present disclosure. The internal cabin 380 may be within a fuselage 381 of the aircraft. For example, one or more fuselage walls may define the internal cabin 380. The internal cabin 380 includes multiple sections, including a main cabin 382 having passenger seats 383, and an aft section 385 behind the main cabin 382. It is to be understood that the internal cabin 380 may include more or less sections than shown.

The internal cabin 380 may include a single aisle 384 that leads to the aft section 385. The single aisle 384 may extend through the center of the internal cabin 380 that leads to the aft section 385. For example, the single aisle 384 may be coaxially aligned with a central longitudinal plane of the internal cabin 380.

Polling devices 108 (shown in FIG. 1) are associated with a plurality of the passenger seats 383. For example, each passenger seat 383 within the internal cabin 380 may be associated with a respective polling device 108.

Figure 4:
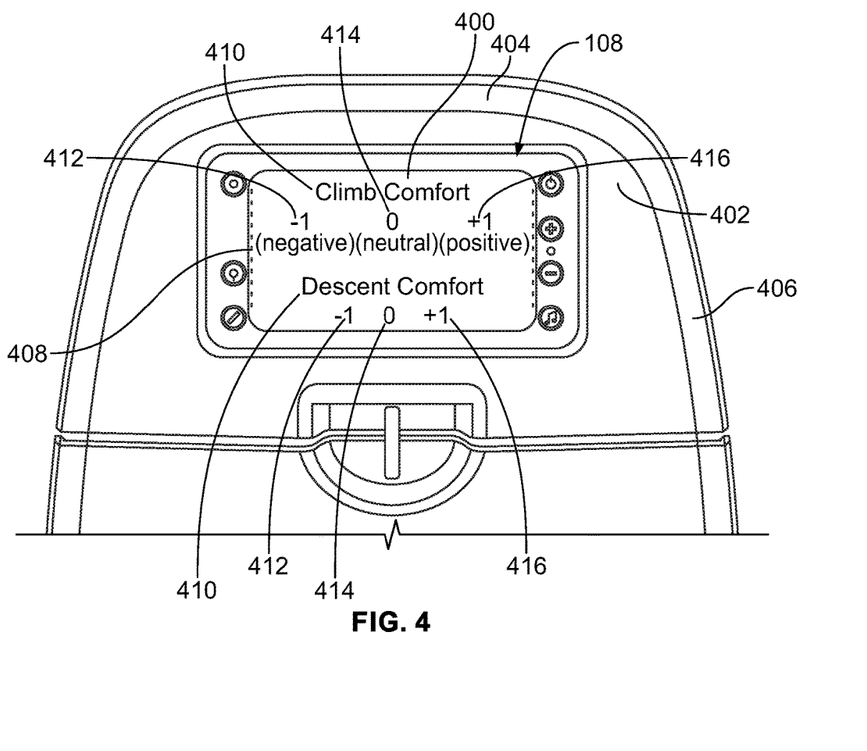
FIG. 4 is a diagrammatic representation of a front view of a polling device onboard an aircraft, according to an embodiment of the present disclosure.

FIG. 4 is a diagrammatic representation of a front view of a polling device 108 onboard an aircraft, according to an embodiment of the present disclosure. The polling device 108 may include a screen 400 (such as a touchscreen monitor, display, or the like) of an in-flight entertainment system onboard the aircraft. As shown, the screen 400 may be mounted to a rear surface 402 of a headrest 404 of an immediately-forward passenger seat 406 in front of a passenger seat (not shown in FIG. 4) associated with the polling device 108. In at least one other embodiment, the polling device 108 may be mounted to other portions of the immediately-forward passenger seat 406, the passenger seat (not shown), a divider wall within the aircraft, and/or the like.

The polling device 108 shown in FIG. 4 is displaying a cabin pressure poll 408 on the screen 400. The cabin pressure poll 408 includes one or more query messages 410 (such as "Climb Comfort," and "Descent Comfort"), each of which may include a negative rating 412, a neutral rating 414, and a positive rating 416. The ratings 412, 414, and 416 may be associated with virtual buttons, dials, sliders, or the like. While the ratings 412, 414, and 416 are shown as numerical indicia, the ratings 412, 414, and 416 may include other indicia, such as color coding, text, graphics, and/or the like. The polling device 108 includes at least one input medium, such as a touchscreen interface of the screen 400, and/or one or more buttons, keys, switches, or the like.

Figure 5:
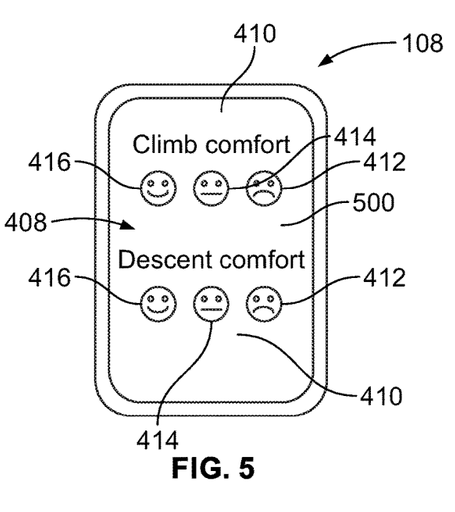
FIG. 5 is a diagrammatic representation of a front view of a polling device onboard an aircraft, according to an embodiment of the present disclosure.

FIG. 5 is a diagrammatic representation of a front view of a polling device 108 onboard an aircraft, according to an embodiment of the present disclosure. The polling device 108 may be a handheld smart device, such as a smart phone, tablet, pad, or the like, assigned to or otherwise associated with a passenger. The polling device 108 includes a screen 500 (such as a touchscreen monitor, display, or the like) of the handheld smart device.

The polling device 108 shown in FIG. 5 is displaying a cabin pressure poll 408 on the screen 500. The cabin pressure poll 408 includes the query messages 410, and the ratings 412, 414, and 416. The ratings 412, 414, and 416 may include numerical, text, graphic, and/or color coded indicia that allow a passenger to input pressure comfort data through the polling device 108. As shown in FIG. 5, the indicia may be graphics. For example, the negative rating 412 may be a red frowning face, the neutral rating 414 may be a yellow emotionless face, and the positive rating 416 may be a green smiling face. In at least one embodiment, the input medium for the polling device 108 may be a touchscreen interface of the screen 500, and/or one or more buttons, keys, switches, of the polling device 108.

Figure 6:
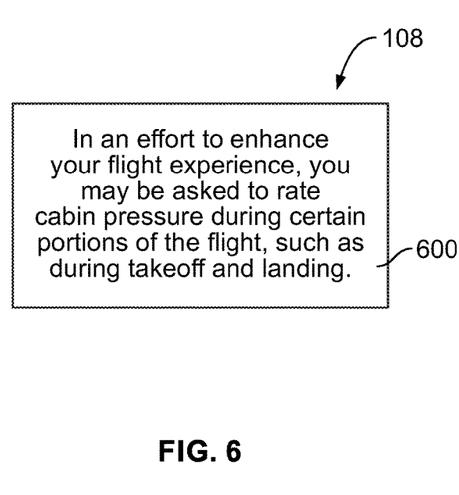
FIG. 6 is a diagrammatic representation of a front view of a polling device showing a polling awareness message, according to an embodiment of the present disclosure.

FIG. 6 is a diagrammatic representation of a front view of a polling device 108 (such as shown in FIG. 1, 4, or 5) showing a polling awareness message 600, according to an embodiment of the present disclosure. The polling awareness message 600 provides a passenger with an awareness of possible cabin pressure or motion effects polling during the flight.

Figure 7:
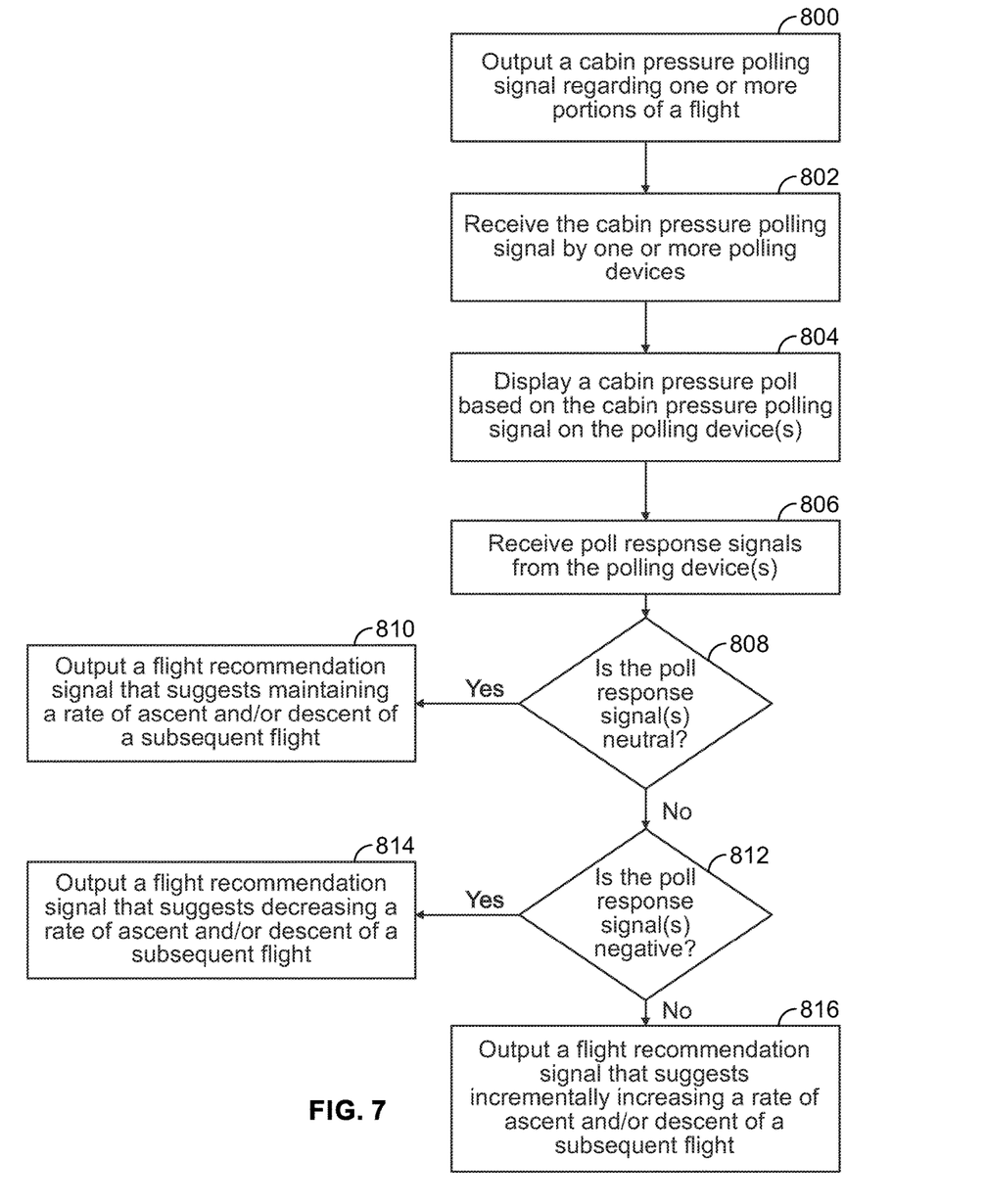
FIG. 7 illustrates a flow chart of a method of assessing cabin pressure during a flight, according to an embodiment of the present disclosure.

FIG. 7 illustrates a flow chart of a method of assessing cabin pressure during a flight, according to an embodiment of the present disclosure. Referring to FIGS. 1 and 7, the method begins at 800, at which the cabin pressure assessment control unit 104 outputs a cabin pressure polling signal regarding one or more portions of the flight. For example, the cabin pressure polling signal may be with respect to an ascent portion of the flight, and/or a descent portion of the flight. The cabin pressure assessment control unit 104 may output the cabin pressure polling signal during the relevant portion of the flight, or after the relevant portion of the flight (such as after the aircraft 102 has reached a cruising altitude or after the aircraft 102 has landed and is taxiing to a gate).

At 802, the polling device(s) 108 receive the cabin pressure polling signal from the cabin pressure assessment control unit 104. Upon receiving the cabin pressure polling signal, the polling device(s) 108 display a cabin pressure poll based on the cabin pressure polling signal at 804. Passenger(s) associated with the polling device(s) 108 are then able to input cabin pressure ratings through the polling device(s) 108. At 806, the cabin pressure assessment control unit 104 receives poll response signals indicative of passenger cabin pressure rating(s) from the polling device(s) 108.

At 808, the cabin pressure assessment control unit 104 determines whether the poll response signal(s) are neutral (for example, an aggregate of multiple poll response signals may be neutral). If so, the method proceeds to 810, at which the cabin pressure assessment control unit 104 outputs a flight recommendation signal that suggests maintaining a rate of ascent and/or descent of a subsequent flight.

If, however, the poll response signal(s) is not neutral at 808, the method proceeds to 812, at which the cabin pressure assessment control unit 104 determines whether the poll response signal(s) is negative (for example, an aggregate of multiple poll response signals may be negative). If the poll response signal(s) is negative, the method proceeds to 814, at which the cabin pressure assessment control unit 104 outputs a flight recommendation signal that suggests decreasing a rate of ascent and/or descent (resulting in an ascent and/or descent that is less steep, or with a reduced slope) of a subsequent flight.

If, however, the poll response signal(s) is not neutral at 808, and not negative at 812, then the poll response signal(s) (or an aggregate of multiple poll response signals) is positive, in which case the method proceeds from 812 to 816, at which the cabin pressure assessment control unit 104 may output a flight recommendation signal that suggests incrementally increasing a rate of ascent and/or descent of a subsequent flight, in order to decrease flight time and reduce fuel consumption, while at the same time ensuring that the passengers are comfortable onboard the aircraft 102. In at least one embodiment, the cabin pressure assessment control unit 104 outputs a flight recommendation signal suggesting an increased rate of ascent and/or descent if the poll response signal(s) meet or exceed a predetermined threshold average value. For example, if a positive poll response signal is equal to 1, the predetermined threshold average value of a plurality of poll responsive signals may be 0.5-0.75. Optionally, if the poll response signal(s) is positive (or averages positively above neutral), the method may proceed from 812 to 816.

In at least one embodiment, the polling may be aircraft specific, as there may be structural build variations between different aircraft. For example, passengers in one aircraft may not experience discomfort at a rate of ascent for one aircraft; however, passengers in another aircraft may experience discomfort at the same rate of ascent in a different aircraft.

Figure 8:
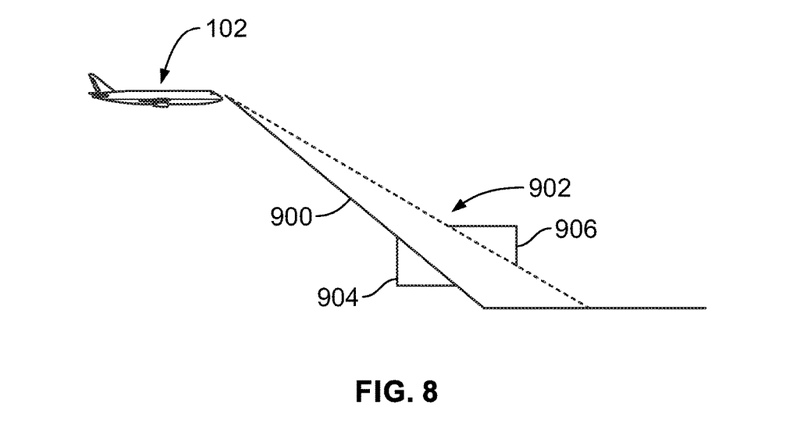
FIG. 8 is a diagrammatic representation of a lateral view of a descent path and a future descent path of an aircraft, according to an embodiment of the present disclosure.

FIG. 8 is a diagrammatic representation of a lateral view of a descent path 900 and a future descent path 902 of the aircraft 102, according to an embodiment of the present disclosure. The descent path 900 includes a first slope 904 associated with a first rate of descent. Based on the first rate of descent, passengers may input poll response signals that are interpreted by the cabin pressure assessment control unit 104 as an aggregate negative pressure comfort factor. That is, the first rate of descent may have caused passenger discomfort. Accordingly, the cabin pressure assessment control unit 104 may output a flight recommendation signal indicating that the first rate of descent is too quick (the first slope 904 is too steep) and the future descent path 902 should include a second slope 906 that is less steep than the first slope 904, thereby resulting in a second rate of descent that is less than the first rate of descent.

In at least one embodiment, a rate of ascent and/or descent may be adjusted to the steepest slope at which no passenger experiences discomfort. That is, an aircraft operator may ensure passenger comfort before adjusting for any other factors (such as fuel burn or flight time).

In at least one embodiment, passenger comfort levels may be based on particular seat locations onboard an aircraft. The systems and methods may correlate passenger comfort levels with respect to particular seat locations onboard an aircraft.

Referring to FIGS. 1-8, embodiments of the present disclosure provide systems and methods for assessing internal cabin pressure within an aircraft. Embodiments of the present disclosure provide systems and methods for determining efficient rates of ascent and descent of an aircraft based on passenger comfort during such times of ascent and descent.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A cabin pressure assessment system for an aircraft, the cabin pressure assessment system comprising:
    a plurality of polling devices within an internal cabin of the aircraft, wherein the plurality of polling devices are associated with passenger seats onboard the aircraft; and
    a cabin pressure assessment control unit communicatively coupled to the plurality of polling devices, wherein the cabin pressure assessment control unit is configured to receive cabin pressure comfort data from the plurality of polling devices, wherein the cabin pressure assessment control unit is configured to output a flight recommendation signal regarding one or more portions of a future flight based on the cabin pressure comfort data.

2. The cabin pressure assessment system of claim 1, wherein the cabin pressure comfort data relates to one or both of an ascent or a descent of the aircraft during a flight.

3. The cabin pressure assessment system of claim 1, wherein the cabin pressure assessment control unit is configured to output a cabin pressure polling signal to the plurality of polling devices, and wherein the plurality of polling devices are configured to display a cabin pressure poll for passengers based on the cabin pressure polling signal.

4. The cabin pressure assessment system of claim 3, wherein the cabin pressure poll comprises indicia of negative comfort, neutral comfort, and positive comfort.

5. The cabin pressure assessment system of claim 4, wherein the indicia comprises one or more of a numerical representation, a text representation, a graphic representation, or a color-coded representation.

6. The cabin pressure assessment system of claim 1, wherein the flight recommendation signal represents a suggestion to decrease one or both of an ascent rate or a descent rate in response to the cabin pressure comfort data being negative.

7. The cabin pressure assessment system of claim 1, wherein the flight recommendation signal represents a suggestion to increase one or both of an ascent rate or a descent rate in response to the cabin pressure comfort data being positive.

8. The cabin pressure assessment system of claim 1, wherein the cabin pressure assessment control unit determines a weighted average of the cabin pressure comfort data based on:

$$\beta = \frac{n_{pos} + 0.5 \cdot n_{neut} + 0 \cdot n_{neg}}{n_{pos} + n_{neut} + n_{neg}}$$

in which $\beta$ is a pressure comfort factor for a particular time period of a flight, $n_{pos}$ is a number of passengers with positive feedback, $n_{neut}$ is a number of passengers with neutral feedback, and $n_{neg}$ is a number of passengers with negative feedback.

9. The cabin pressure assessment system of claim 8, wherein the cabin pressure assessment control unit determines: pressure comfort factors $\beta_c$ for an ascent of a flight and $\beta_d$ for a descent of a flight, and corrected pressure differentials for the ascent and descent based on:

$$\partial p_{corrected} = \beta \cdot \partial p_{max}$$

in which $\partial p_{max}$ is a maximum pressure differential measured during the flight.

10. The cabin pressure assessment system of claim 1, further comprising a poll triggering device, wherein engagement of the poll triggering device causes the cabin pressure assessment control unit to output a cabin pressure polling signal to the plurality of polling devices.

11. The cabin pressure assessment system of claim 1, wherein at least one of the plurality of polling devices includes a screen mounted to a passenger seat.

12. The cabin pressure assessment system of claim 1, wherein at least one of the plurality of polling devices is a handheld device of a passenger.

13. The cabin pressure assessment system of claim 1, wherein the cabin pressure assessment control unit is configured to output a polling awareness signal to the plurality of polling devices, wherein the plurality of polling devices are configured to display a polling awareness message based on the polling awareness signal, and wherein the polling awareness message provides guidance as to a cabin pressure poll.

14. A cabin pressure assessment method for an aircraft, the cabin pressure assessment method comprising:
    associating a plurality of polling devices with passenger seats within an internal cabin of the aircraft;
    communicatively coupling a cabin pressure assessment control unit to the plurality of polling devices;
    receiving cabin pressure comfort data by the cabin pressure assessment control unit from the plurality of polling devices; and
    outputting, from the cabin pressure assessment control unit, a flight recommendation signal regarding one or more portions of a future flight based on the cabin pressure comfort data.

15. The cabin pressure assessment method of claim 14, wherein the cabin pressure comfort data relates to one or both of an ascent or a descent of the aircraft during a flight.

16. The cabin pressure assessment method of claim 14, further comprising:
    using the cabin pressure assessment control unit to output a cabin pressure polling signal to the plurality of polling devices; and
    displaying a cabin pressure poll for passengers based on the cabin pressure polling signal on the plurality of polling devices.

17. The cabin pressure assessment method of claim 16, wherein the cabin pressure poll comprises indicia of negative comfort, neutral comfort, and positive comfort.

18. The cabin pressure assessment method of claim 14, wherein the flight recommendation signal represents a suggestion to decrease one or both of an ascent rate or a descent rate in response to the cabin pressure comfort data being negative.

19. The cabin pressure assessment method of claim 14, wherein the flight recommendation signal represents a suggestion to increase one or both of an ascent rate or a descent rate in response to the cabin pressure comfort data being positive.

20. The cabin pressure assessment method of claim 14, further comprising using the cabin pressure assessment control unit to:

determine a weighted average of the cabin pressure comfort data based on:

$$\beta = \frac{n_{pos} + 0.5 \cdot n_{neut} + 0 \cdot n_{neg}}{n_{pos} + n_{neut} + n_{neg}}$$

in which $\beta$ is a pressure comfort factor for a particular time period of a flight, $n_{pos}$ is a number of passengers with positive feedback, $n_{neut}$ is a number of passengers with neutral feedback, and $n_{neg}$ is a number of passengers with negative feedback; and determine pressure comfort factors $\beta_c$ for an ascent of a flight and $\beta_d$ for a descent of a flight, and corrected pressure differentials for the ascent and descent based on:

$$\partial p_{corrected} = \beta \cdot \partial p_{max}$$

in which $\partial p_{max}$ is a maximum pressure differential measured during the flight.

21. An aircraft comprising:
a fuselage defining an internal cabin;
a plurality of passenger seats within the internal cabin; and
a cabin pressure assessment system for an aircraft, the cabin pressure assessment system comprising:
a plurality of polling devices within the internal cabin of the aircraft, wherein the plurality of polling devices are associated with the passenger seats onboard the aircraft; and
a cabin pressure assessment control unit communicatively coupled to the plurality of polling devices, wherein the cabin pressure assessment control unit is configured to: (a) receive cabin pressure comfort data from the plurality of polling devices, wherein the cabin pressure comfort data relates to one or both of an ascent or a descent of the aircraft during a flight, (b) output a cabin pressure polling signal to the plurality of polling devices, wherein the plurality of polling devices are configured to display a cabin pressure poll for passengers based on the cabin pressure polling signal, wherein the cabin pressure poll comprises indicia of negative comfort, neutral comfort, and positive comfort, and (c) output a flight recommendation signal regarding one or more portions of a future flight based on the cabin pressure comfort data, wherein the flight recommendation signal represents a first suggestion to decrease one or both of an ascent rate or a descent rate in response to the cabin pressure comfort data being negative, wherein the flight recommendation signal represents a second suggestion to increase one or both of an ascent rate or a descent rate in response to the cabin pressure comfort data being positive.

22. A cabin pressure assessment system for an aircraft, the cabin pressure assessment system comprising:

a plurality of polling devices within an internal cabin of the aircraft, wherein the plurality of polling devices are associated with passenger seats onboard the aircraft; and a cabin pressure assessment control unit communicatively coupled to the plurality of polling devices, wherein the cabin pressure assessment control unit is configured to receive cabin pressure comfort data from the plurality of polling devices, wherein the cabin pressure assessment control unit determines a weighted average of the cabin pressure comfort data based on:

$$\beta = \frac{n_{pos} + 0.5 \cdot n_{neut} + 0 \cdot n_{neg}}{n_{pos} + n_{neut} + n_{neg}}$$

in which $\beta$ is a pressure comfort factor for a particular time period of a flight, $n_{pos}$ is a number of passengers with positive feedback, $n_{neut}$ is a number of passengers with neutral feedback, and $n_{neg}$ is a number of passengers with negative feedback.

23. The cabin pressure assessment system of claim 22, wherein the cabin pressure comfort data relates to one or both of an ascent or a descent of the aircraft during a flight.

24. The cabin pressure assessment system of claim 22, wherein the cabin pressure assessment control unit is configured to output a cabin pressure polling signal to the plurality of polling devices, and wherein the plurality of polling devices are configured to display a cabin pressure poll for passengers based on the cabin pressure polling signal.

25. The cabin pressure assessment system of claim 24, wherein the cabin pressure poll comprises indicia of negative comfort, neutral comfort, and positive comfort.

26. The cabin pressure assessment system of claim 25, wherein the indicia comprises one or more of a numerical representation, a text representation, a graphic representation, or a color-coded representation.

27. The cabin pressure assessment system of claim 22, wherein the cabin pressure assessment control unit determines: pressure comfort factors $\beta_c$ for an ascent of a flight and $\beta_d$ for a descent of a flight, and corrected pressure differentials for the ascent and descent based on:

$$\partial p_{corrected} = \beta \cdot \partial p_{max}$$

in which $\partial p_{max}$ is a maximum pressure differential measured during the flight.

28. The cabin pressure assessment system of claim 22, further comprising a poll triggering device, wherein engagement of the poll triggering device causes the cabin pressure assessment control unit to output a cabin pressure polling signal to the plurality of polling devices.

29. The cabin pressure assessment system of claim 22, wherein at least one of the plurality of polling devices includes a screen mounted to a passenger seat.

30. The cabin pressure assessment system of claim 22, wherein at least one of the plurality of polling devices is a handheld device of a passenger.

31. The cabin pressure assessment system of claim 22, wherein the cabin pressure assessment control unit is configured to output a polling awareness signal to the plurality of polling devices, wherein the plurality of polling devices are configured to display a polling awareness message based on the polling awareness signal, and wherein the polling awareness message provides guidance as to a cabin pressure poll.

32. A cabin pressure assessment system for an aircraft, the cabin pressure assessment system comprising:
 a plurality of polling devices within an internal cabin of the aircraft, wherein the plurality of polling devices are associated with passenger seats onboard the aircraft;
 a cabin pressure assessment control unit communicatively coupled to the plurality of polling devices, wherein the cabin pressure assessment control unit is configured to receive cabin pressure comfort data from the plurality of polling devices; and
 a poll triggering device, wherein engagement of the poll triggering device causes the cabin pressure assessment control unit to output a cabin pressure polling signal to the plurality of polling devices.

33. The cabin pressure assessment system of claim 32, wherein the cabin pressure comfort data relates to one or both of an ascent or a descent of the aircraft during a flight.

34. The cabin pressure assessment system of claim 32, wherein the cabin pressure assessment control unit is configured to output a cabin pressure polling signal to the plurality of polling devices, and wherein the plurality of polling devices are configured to display a cabin pressure poll for passengers based on the cabin pressure polling signal.

35. The cabin pressure assessment system of claim 34, wherein the cabin pressure poll comprises indicia of negative comfort, neutral comfort, and positive comfort.

36. The cabin pressure assessment system of claim 35, wherein the indicia comprises one or more of a numerical representation, a text representation, a graphic representation, or a color-coded representation.

37. The cabin pressure assessment system of claim 32, wherein at least one of the plurality of polling devices includes a screen mounted to a passenger seat.

38. The cabin pressure assessment system of claim 32, wherein at least one of the plurality of polling devices is a handheld device of a passenger.

39. The cabin pressure assessment system of claim 32, wherein the cabin pressure assessment control unit is configured to output a polling awareness signal to the plurality of polling devices, wherein the plurality of polling devices are configured to display a polling awareness message based on the polling awareness signal, and wherein the polling awareness message provides guidance as to a cabin pressure poll.

40. A cabin pressure assessment system for an aircraft, the cabin pressure assessment system comprising:
 a plurality of polling devices within an internal cabin of the aircraft, wherein the plurality of polling devices are associated with passenger seats onboard the aircraft; and
 a cabin pressure assessment control unit communicatively coupled to the plurality of polling devices, wherein the cabin pressure assessment control unit is configured to receive cabin pressure comfort data from the plurality of polling devices, wherein the cabin pressure assessment control unit is configured to output a polling awareness signal to the plurality of polling devices, wherein the plurality of polling devices are configured to display a polling awareness message based on the polling awareness signal, and wherein the polling awareness message provides guidance as to a cabin pressure poll.

41. The cabin pressure assessment system of claim 40, wherein the cabin pressure comfort data relates to one or both of an ascent or a descent of the aircraft during a flight.

42. The cabin pressure assessment system of claim 40, wherein the cabin pressure assessment control unit is configured to output a cabin pressure polling signal to the plurality of polling devices, and wherein the plurality of polling devices are configured to display a cabin pressure poll for passengers based on the cabin pressure polling signal.

43. The cabin pressure assessment system of claim 42, wherein the cabin pressure poll comprises indicia of negative comfort, neutral comfort, and positive comfort.

44. The cabin pressure assessment system of claim 43, wherein the indicia comprises one or more of a numerical representation, a text representation, a graphic representation, or a color-coded representation.

45. The cabin pressure assessment system of claim 40, wherein at least one of the plurality of polling devices includes a screen mounted to a passenger seat.

46. The cabin pressure assessment system of claim 40, wherein at least one of the plurality of polling devices is a handheld device of a passenger.

47. A cabin pressure assessment method for an aircraft, the cabin pressure assessment method comprising:
 associating a plurality of polling devices with passenger seats within an internal cabin of the aircraft;
 communicatively coupling a cabin pressure assessment control unit to the plurality of polling devices;
 receiving cabin pressure comfort data by the cabin pressure assessment control unit from the plurality of polling devices; and
 using the cabin pressure assessment control unit to:
 determine a weighted average of the cabin pressure comfort data based on:

$$\beta = \frac{n_{pos} + 0.5 \cdot n_{neut} + 0 \cdot n_{neg}}{n_{pos} + n_{neut} + n_{neg}}$$

in which $\beta$ is a pressure comfort factor for a particular time period of a flight, $n_{pos}$ is a number of passengers with positive feedback, $n_{neut}$ is a number of passengers with neutral feedback, and $n_{neg}$ is a number of passengers with negative feedback; and
 determine pressure comfort factors $\beta_c$ for an ascent of a flight and $\beta_d$ for a descent of a flight, and corrected pressure differentials for the ascent and descent based on:

$$\partial p_{corrected} = \beta \cdot \partial p_{max}$$

in which $\partial p_{max}$ is a maximum pressure differential measured during the flight.

48. The cabin pressure assessment method of claim 47, wherein the cabin pressure comfort data relates to one or both of an ascent or a descent of the aircraft during a flight.

49. The cabin pressure assessment method of claim 47, further comprising:
 using the cabin pressure assessment control unit to output a cabin pressure polling signal to the plurality of polling devices; and
 displaying a cabin pressure poll for passengers based on the cabin pressure polling signal on the plurality of polling devices.

50. The cabin pressure assessment method of claim 49, wherein the cabin pressure poll comprises indicia of negative comfort, neutral comfort, and positive comfort.

* * * * *